(12) United States Patent
Reeves et al.

(10) Patent No.: US 8,424,070 B1
(45) Date of Patent: Apr. 16, 2013

(54) DYNAMIC NETWORK-CENTRIC GENERATION OF PUBLIC SERVICE ACCESS IDENTIFICATION

(75) Inventors: Raymond Emilio Reeves, Olathe, KS (US); Prabhat Karki, Olathe, KS (US); Sailesh Lamsal, Olathe, KS (US); Ryan Alan Wick, Apollo Beach, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 582 days.

(21) Appl. No.: 12/613,185

(22) Filed: Nov. 5, 2009

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC ............... 726/7; 726/5; 726/6; 726/8; 726/9; 726/10

(58) Field of Classification Search ............... 726/5
See application file for complete search history.

(56) References Cited

U.S. PATENT DOCUMENTS

| | | | |
|---|---|---|---|
| 6,606,663 B1* | 8/2003 | Liao et al. | 709/229 |
| 7,103,784 B1* | 9/2006 | Brown et al. | 726/9 |
| 7,716,492 B1* | 5/2010 | Saulpaugh et al. | 713/185 |
| 2003/0046586 A1* | 3/2003 | Bheemarasetti et al. | 713/201 |
| 2003/0145223 A1* | 7/2003 | Brickell et al. | 713/201 |
| 2004/0225878 A1* | 11/2004 | Costa-Requena et al. | 713/150 |
| 2005/0097330 A1* | 5/2005 | Lundblade | 713/176 |
| 2007/0006285 A1* | 1/2007 | Stafie et al. | 726/4 |
| 2007/0150947 A1* | 6/2007 | Vijayakumar et al. | 726/17 |
| 2009/0265775 A1* | 10/2009 | Wisely et al. | 726/9 |
| 2010/0037046 A1* | 2/2010 | Ferg et al. | 713/155 |
| 2010/0162373 A1* | 6/2010 | Springfield et al. | 726/6 |

\* cited by examiner

*Primary Examiner* — Matthew Henning

(57) ABSTRACT

Systems and media are provided for authenticating a mobile device using credentials supplied by a network rather than using a credential configured in the mobile device. As the mobile device requests access to the Internet, an AUD request is sent to an AUD service based on the generic credential in the mobile device. The AUD service generates a user-specific credential for the mobile that enables authentication by an authentication server and subsequent registration at a registration server.

20 Claims, 3 Drawing Sheets

DYNAMIC NETWORK-CENTRIC GENERATION OF PUBLIC SERVICE ACCESS IDENTIFICATION

BACKGROUND

Currently, data connectivity, service provisioning, and delivery rely on a two-tiered, statically-provisioned set of credentials, one tier identifying the terminal or device that can acquire connectivity services and the other tier identifying the entity allowed to use the services. For example, a mobile device and the user of the mobile device would include the two tiers. While the terminal or device is not accessible for direct manipulation and is strictly secured to avert unintended changes that may render the terminal or device useless, the entity (e.g. person) includes exposure to potential human manipulation which could result in faulty updates, such as inputting an extra characters or missing a character altogether. Moreover, in some cases, individuals may not be interested in inputting information for fear of letting their identity be known. Further, individuals have to be concerned with whether their terminals are appropriately configured. It would be desirable to have a network-controlled user authorization where a mobile device and user are authenticated from credentials provided by a network rather than credentials provided by the mobile device and the user.

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section below. This summary is not intended to identify key features or essential features of the claimed subject matter, nor is it intended to be used as an aid in isolation to determine the scope of the claimed subject matter.

In a first aspect, a system for authenticating a mobile device with a re-assignable generic credential in the mobile device is provided that includes a network access server that receives the re-assignable generic credential from the mobile device when the mobile device requests data services. The network access server recognizes the re-assignable generic credential as an authentication user delegate request based on a format of the re-assignable generic credential. An authentication server receives the re-assignable generic credential from the network access server, receives information that the re-assignable generic credential is the authentication user delegate request, verifies that the re-assignable generic credential is valid, and contacts an authentication user delegate server through a relay because the re-assignable generic credential is the authentication user delegate request. The authentication user delegate server receives the re-assignable generic credential because the re-assignable generic credential is the authentication user delegate request, selects a unique user credential for the mobile device, and instructs the authentication server to use the unique user credential to authenticate the mobile device. The authentication server instructs the network access server to use the unique user credential for the mobile device in place of the re-assignable generic credential. The network access server registers the mobile device at a registration server using the unique user credential.

In a second aspect, computer-readable media having computer useable instructions executed by computing devices cause servers to authenticate a mobile device. During an execution of the computer useable instructions, a credential is received at an authentication server. The credential comes from the mobile device. The mobile device requests access to data services. A determination is made if the credential is an authentication user delegate request based on a format of the credential. If the credential is not the authentication user delegate request, the mobile device is authenticated at the authentication server and an acknowledgement is sent that the mobile device is authenticated. If the credential is the authentication user delegate request, the credential is verified if valid, an authentication user delegate server is contacted through a relay of a plurality of relays. The relay is selected based on the format of the credential. The relays are respectively connected to authentication user delegate servers. The credential is received at the authentication user delegate server. A unique user credential is selected for the mobile device. The authentication user delegate server instructs the authentication server to use the unique user credential in place of the credential to authenticate the mobile device. The acknowledgement is sent that the mobile device is authenticated.

In a third aspect, a system for causing servers to authenticate a mobile device is provided that includes an authentication server that receives a credential and determines if the credential is an authentication user delegate request based on a format of the credential. The credential comes from the mobile device. The mobile device requests access to data services. If the credential is not the authentication user delegate request, the authentication server authenticates the mobile device at the authentication server and sends an acknowledgement that the mobile device is authenticated. If the credential is the authentication user delegate request, the authentication server verifies that the credential is valid and contacts an authentication user delegate server through a relay of a plurality of relays. The relay is selected based on the format of the credential. The plurality of relays is respectively connected to a plurality of authentication user delegate servers. The authentication server sends the acknowledgement that the mobile device is authenticated after receiving instructions from the authentication user delegate server. The authentication user delegate server receives the credential, selects a unique user credential for the mobile device, and instructs the authentication server to use the unique user credential to authenticate the mobile device.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
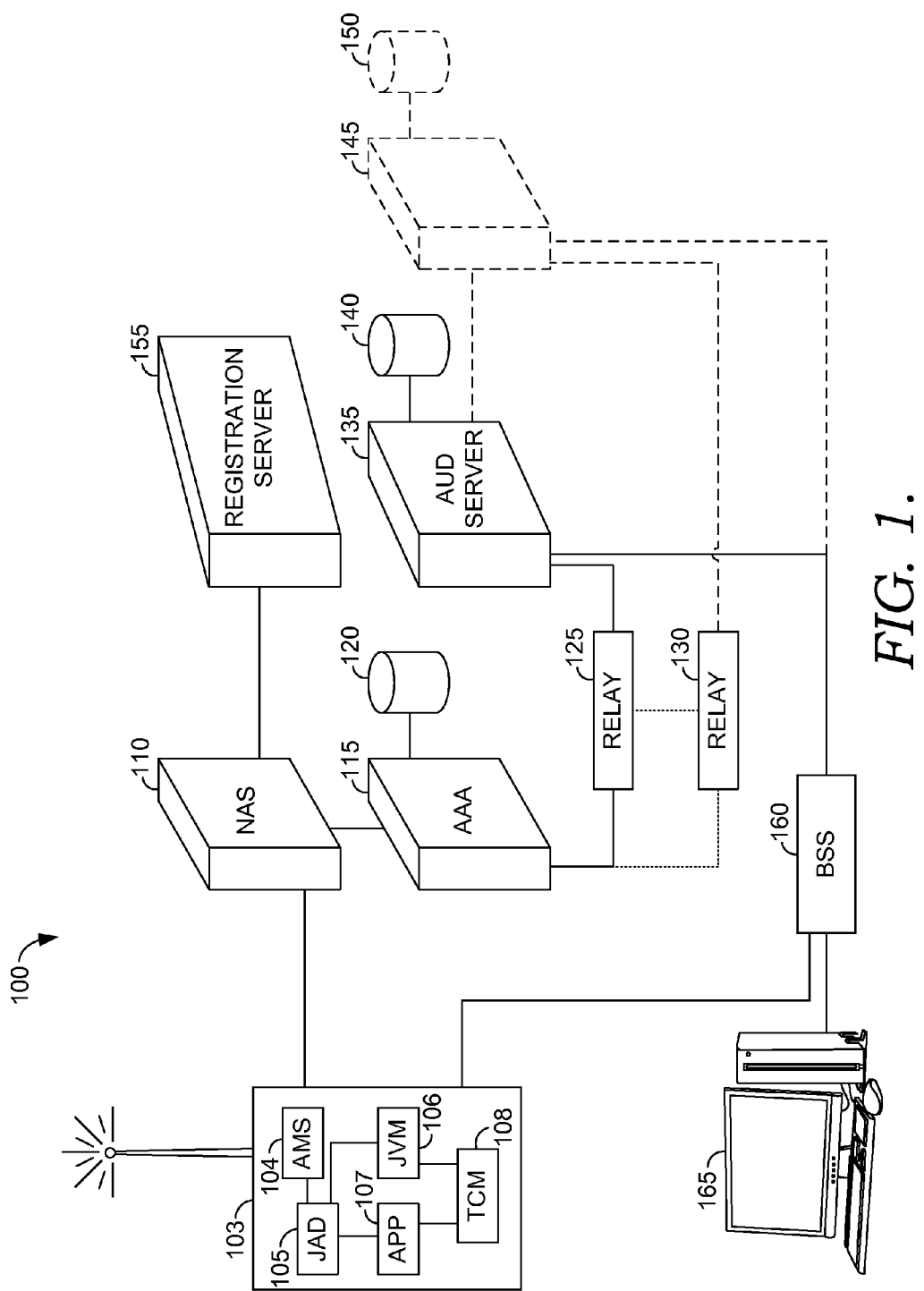
FIG. 1 illustrates a block diagram of an exemplary network for authenticating a mobile device implemented in accordance with an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AAA | Authentication, Authorization, and Accounting |
| AMS | Application Management System |
| APP | Application |
| AT | Access Terminal |
| AUD | Authentication User Delegate |
| BSS | Business Supporting Systems |
| CD-ROM | Compact Disc—Read-Only Memory |
| EEPROM | Electronically Erasable Programmable Read-Only Memory |
| IP | Internet Protocol |
| JAD | Java Decompiler |
| JVM | Java Virtual Machine |
| MIP | Mobile Internet Protocol |
| NAS | Network Access Server |
| RAM | Random Access Memory |
| ROM | Read-Only Memory |
| TCM | Telecommunication Management |

Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Authentication User Delegate

Implementations of embodiments of the present invention provide a network-based user authentication based on a network-centric authentication user delegate (AUD). For each participating mobile device, the authentication user delegate is responsible for knowing the authorized user and public service identifiers based on contextual information, including but not limited to time and location. Implementations of embodiments of the present invention can include an application management system (AMS) and a Java 2 Micro Edition (J2ME) environment. AMS and J2ME can accommodate description directives seeking to enforce dynamic public identifiers that may be a part of an AUD-supported product or service. Implementations of embodiments of the present invention can include a terminal connectivity manager such as a mobile internet protocol (MIP) agent. The MIP agent conveys to a network access server (NAS) that a connectivity request is for an AUD-mode connection. The AUD-mode connection can include terminal-specific identifiers as well as network-hosted or dynamically-generated user identifiers. Implementations of embodiments of the present invention can include an authentication, authorization, and accounting (AAA) server and the NAS server. The AAA server provides interactions with an AUD server so that each AUD-mode connection can be validated, and terminal identifiers can be mapped to user identifiers. This mapping process can occur randomly or be based on user preferences. The NAS server can receive a variety of access identifiers including AUD-mode identifiers or traditional/ordinary credentials that are loaded into a mobile device.

To further understand the various aspects of the present invention, several figures shall be discussed in detail to provide a detailed understanding of the present invention.

In FIG. 1, an exemplary network 100 for authenticating a mobile device is shown with a mobile device 103, servers 110, 115, 135, 145, and 155, databases 120, 140, and 150, relays 125 and 130, business supporting systems (BSS) 160, and a computer 160. Network 100 provides exemplary components to authenticate mobile device 103 to obtain data services such as accessing the Internet. Network 100 enables mobile device 103 to access the Internet through traditional or ordinary means by providing unique user credentials from mobile device 103 to the various servers for authentication and registration. However, in accordance with embodiments of the present invention, mobile device 103 can be loaded or pre-configured with a generic credential. When mobile device 103 requests data services or access to the Internet, the generic credential is sent to various servers causing the various servers to generate a specific user credential that is used to authenticate and register mobile device 103. The generic credential cannot be used to authenticate and register mobile device 103, but can be used to trigger AUD-mode services to generate or create an appropriate specific user credential for the authentication and registration.

Continuing with FIG. 1, mobile device 103 can include an AMS 104, JAD 105, JVM 106, APP 107, and TCM 108. AMS 104 allows mobile device 103 to support an AUD-mode service. JAD 105 provides a decompiler for the Java programming language. JVM 106 provides a Java Virtual Machine that enables the execution of other computer programs, applications, or scripts in mobile device 103. APP 107 represents a number of applications located on mobile device 103. TCM 103 identifies the telecommunications or telephone aspects of mobile device 103.

Network access server 110 interfaces with mobile device 103, AAA server 110, and registration server 155. Network access server 110 receives various credentials from mobile device 103 and provides an interface for mobile device 103 to access data services. AAA server 110 performs authentication, authorization, and accounting functions for devices that access the network. AAA server 110 can authenticate devices through traditional methods using database 120. An exemplary database 120 has a set of usernames and passwords that can be checked, verified, or validated for the authentication process. In an implementation of an embodiment of the present invention, AAA server 110 can determine or receive information that the credential received from mobile device 103 is not an ordinary or traditional credential but an AUD credential, triggering additional resources for the authentication process.

When AAA server 110 receives an AUD credential, AAA server 110 accesses a relay, such as relay 125 or 130, to send information to AUD server 135 or 140. AAA server 115 selects a relay from a list of several relays based on a set of rules. For example, AAA server 115 can determine from a format of the AUD credential that a particular relay has to be selected. AAA server 115 can also select the particular relay based on a location of mobile device 103. More particularly, relay 125 may be located in New York and relay 130 may be located in California. AAA server 115 may select relay 125 if mobile device 103 is located near New York. AAA server 115 may also select a relay based on a combination of the set of rules and the location of mobile device 103. It is noted that FIG. 1 shows only relay 125 and relay 130 in the illustration. However, in various implementations of embodiments of the present invention, a different number of relays can be implemented.

A selection of relay 125, relay 130, or any other relay leads to a connection with AUD server 135, AUD server 145, or another AUD server. As shown, each relay connects to a particular AUD server. However, FIG. 1 is only an exemplary illustration where one relay connects to one AUD server. Another implementation of an embodiment of the present invention may illustrate several relays that connect to the same AUD server.

AUD server 135 or 145 can receive the AUD credential along with other information that has traveled from AAA server 115 through either relay 125 or relay 130. AUD server 135 or 145 receives the AUD credential and identifies it as an AUD request. AUD server 135 or 145 selects a unique user credential for mobile device 103 when the AUD credential is received. The unique user credential can take the form of a username and password that are particular to mobile device 103. Note, the username and password can the take the form of the usernames and passwords that are found in database 120. Also, the unique user credential can be generated based on 1) a set of rules, 2) contextual information about the mobile device, 3) user settings in the mobile device, 4) a time, or 5) a geographic location of the mobile device. Any combination of the above items can be used to generate the unique user credential. Further, AUD server 135 or 145 can assign the unique user credential uniquely to each mobile device or can assign the same unique user credential to multiple devices. For example, a service provider may assign the same unique user credential to similarly situated devices, such as business customers belonging to the same account, or residential customers located in a particular geographic location.

The username and password as well as information related to the set of rules, contextual information about the mobile device, user settings in the mobile device, a time, or a geographic location of the mobile device may be stored in database 140 or 150 which can be accessed by AUD server 135 or 145. An implementer of an embodiment of the present invention can create the contents for generating a unique user credential based on various rules and policies. Those rules and policies can be changed to fit the needs of the service provider.

Once a unique user credential is generated or selected by AUD server 135 or 145, AUD server 135 or 145 can send information back to AAA server 115, NAS 110, and registration server 155. AUD server 135 or 145 also has a connection to BSS 160 for various business services that may require access to AUD server 135 or 145. BSS 160 can be manipulated or accessed by a user operating computer 165.

Figure 2:
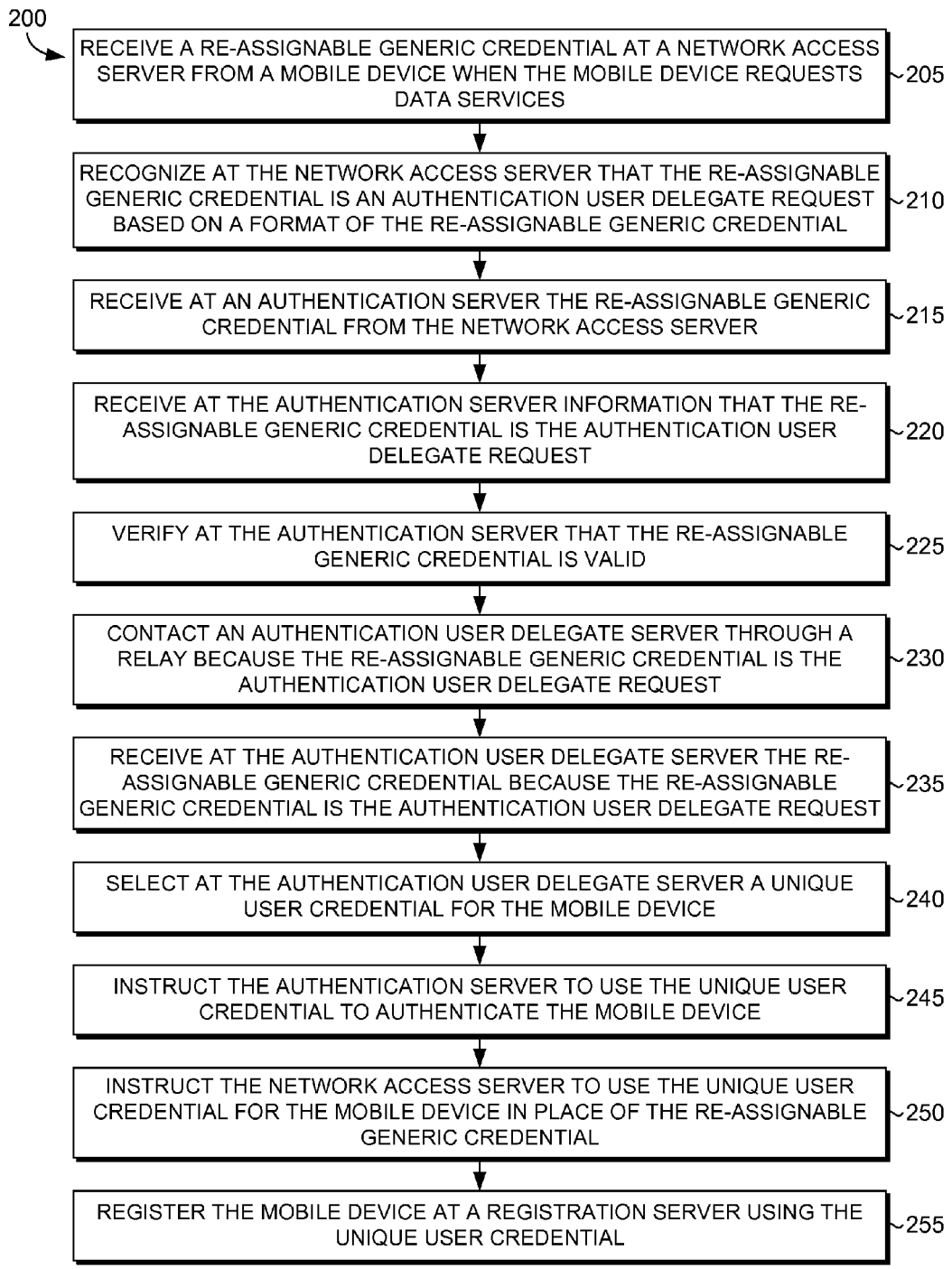
FIG. 2 illustrates a process for authenticating a mobile device with a re-assignable generic credential in the mobile device implemented in accordance with an embodiment of the present invention.

Turning now to FIG. 2, a process for authenticating a mobile device 103 with a re-assignable generic credential in mobile device 103 is shown in a method 200. In a step 205, a re-assignable generic credential is received at NAS 110 from mobile device 103 when mobile device 103 requests data services. In a step 210, NAS 110 recognizes that the re-assignable generic credential is an AUD request based on a format of the re-assignable generic credential. In a step 215, AAA server 115 receives the re-assignable generic credential from NAS 110. In a step 220, AAA server 115 receives information that the re-assignable generic credential is the AUD request. AAA serer 115 verifies that the re-assignable generic credential is valid in a step 225.

In a step 230, AUD server 135 or 145 is contacted respectively through relay 125 or 130. In a step 235, AUD server 135 or 145 receives the re-assignable generic credential. In a step 240, AUD server 135 or 145 selects a unique user credential for mobile device 103 and instructs AAA server 115 to use the unique user credential to authenticate mobile device 103 in a step 245. AAA server 115 instructs NAS 110 to use the unique user credential for mobile device 103 in place of the re-assignable generic credential. In a step 255, registration server 155 registers mobile device 103 to access data services (use the Internet) using the unique user credential.

Figure 3:
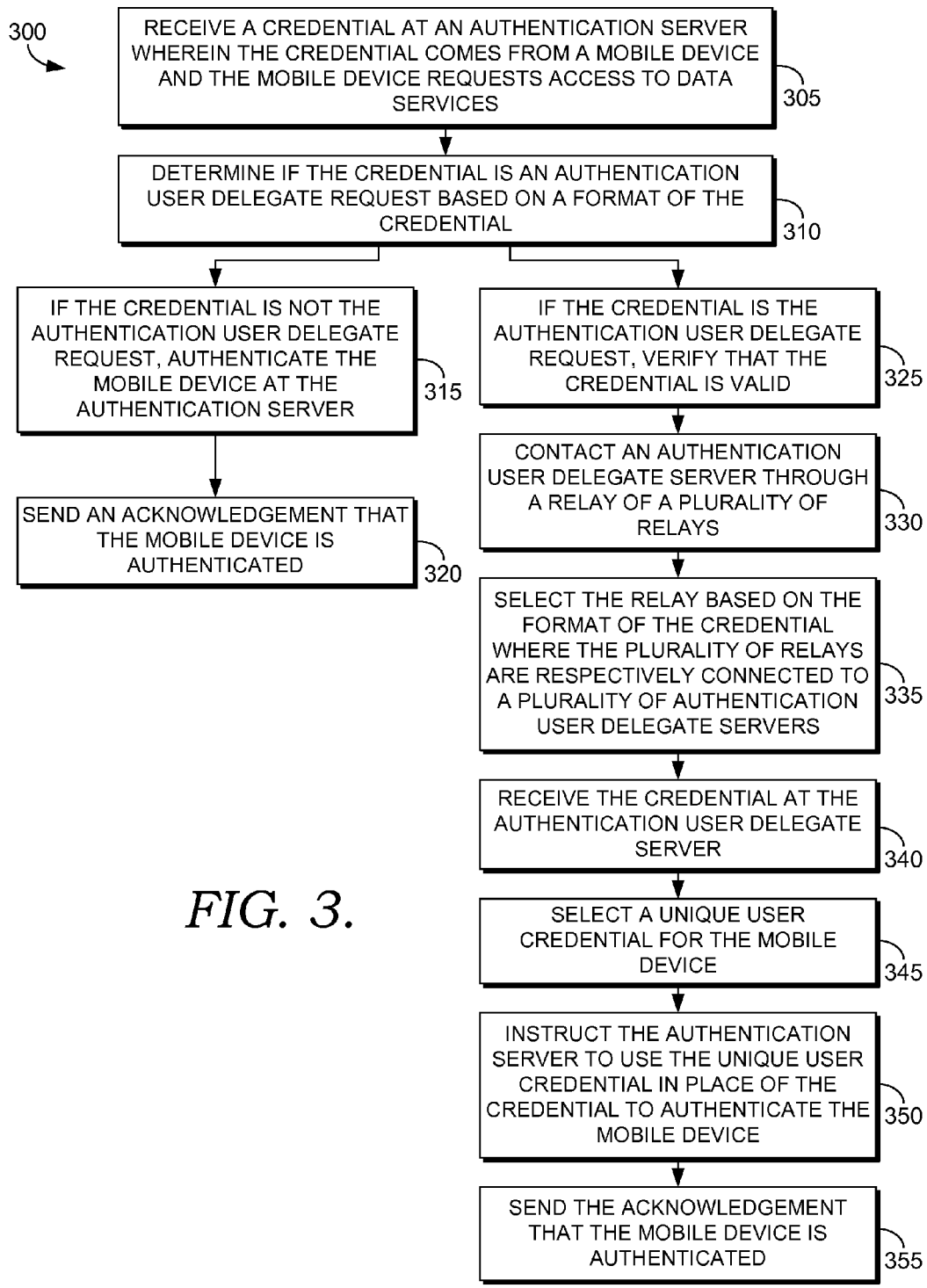
FIG. 3 illustrates a process for causing servers to authenticate a mobile device implemented in accordance with an embodiment of the present invention.

In FIG. 3, a process for causing servers to authenticate a mobile device 103 is shown in a method 300. In a step 305, AAA server 115 receives a credential that comes from mobile device 103. AAA server 115 receives the credential when mobile device 103 requests access to data services such as the Internet. The credential can be pre-programmed into mobile device 103, especially if a user of mobile device 103 subscribes to an AUD service. In such case, mobile device 103 does not have the burden of being configured with a specific user credential. A user-specific credential is provided by a network rather than directly from mobile device 103.

In a step 310, a determination is made if the credential is an AUD request based on a format of the credential. In a step 315, mobile device 103 is authenticated at AAA server 115 if the credential is not an AUD request. This means that the credential is a traditional or ordinary user specific credential that is programmed into mobile device 103. In such case, AAA server 115 can verify or validate the contents of the credential against usernames and password, or other information, that is stored in database 120. Upon authenticating mobile device 103, an acknowledgement is sent to NAS 110 that mobile device 103 is authenticated in a step 320.

In a step 325, if the credential is not an AUD request, AAA server 115 verifies that the credential is valid. In a step 330, an AUD server 135 or 145 is contacted respectively through relay 125 or 130. Relay 125 or 130 may be listed among a plurality of relays. In a step 335, relay 125 or 130 is selected based on the format of the credential where the plurality of relays are respectively connected to a plurality of AUD servers.

In a step 340, AUD server 135 or 145 receives the credential and instructs AAA server 115 to use the unique user credential in place of the credential to authenticate mobile device 103. Like step 320, an acknowledgement is sent to NAS 110 that mobile device 103 is authenticated in a step 355.

Many different arrangements of the various components depicted, as well as components not shown, are possible without departing from the scope of the claims below. Embodiments of our technology have been described with the intent to be illustrative rather than restrictive. Alternative embodiments will become apparent readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for authenticating a mobile device with a re-assignable generic credential in the mobile device, comprising:
   a network access server configured to receive the re-assignable generic credential from the mobile device when the mobile device requests data services, and recognize the re-assignable generic credential as an authentication user delegate request based on a format of the re-assignable generic credential, wherein the re-assignable generic credential is not configured to authenticate the mobile device;
   an authentication server configured to receive the re-assignable generic credential from the network access server, receive information that the re-assignable generic credential is the authentication user delegate request, verify that the re-assignable generic credential is valid, and contact an authentication user delegate server through a relay responsive to the re assignable generic credential being the authentication user delegate request; and
   the authentication user delegate server configured to receive the re-assignable generic credential select a unique user credential for the mobile device, and instruct the authentication server to use the unique user credential to authenticate the mobile device,
   wherein the authentication server instructs the network access server to use the unique user credential for the mobile device in place of the re-assignable generic credential, and wherein the network access server registers the mobile device at a registration server using the unique user credential.

2. The system of claim 1, wherein the network access server cannot register the mobile device with the re-assignable generic credential.

3. The system of claim 2, wherein the re-assignable generic credential is provided to the mobile device when the mobile device participates in an authentication user delegate service.

4. The system of claim 3, wherein the authentication user delegate request comprises an identifier that indicates an authentication of the mobile device is accomplished using credentials provided by a network service rather than using credentials in the mobile device.

5. The system of claim 4, wherein the unique user credential comprises a username and password for the mobile device.

6. The system of claim 4, wherein the unique user credential is generated at the authentication user delegate server based on at least one of a set of rules, contextual information about the mobile device, user settings in the mobile device, a time, and a geographic location of the mobile device.

7. The system of claim 6, wherein the unique user credential is assigned and shared among multiple mobile devices.

8. One or more non-transitory computer-readable media having computer useable instructions embodied thereon for causing one or more servers to authenticate a mobile device, comprising:
   receiving a credential at an authentication server transferred by the mobile device wherein the mobile device requests access to data services;
   determining if the credential comprises an authentication user delegate request based on a format of the credential;
   if the credential does not comprise the authentication user delegate request, authenticating the mobile device at the authentication server and sending an acknowledgement that the mobile device is authenticated; and
   if the credential comprises the authentication user delegate request and the credential comprises a re-assignable generic credential that is not configured to authenticate the mobile device:
      verifying that the credential is valid, contacting an authentication user delegate server through a relay of a plurality of relays wherein the relay is selected based on the format of the credential and wherein the plurality of relays are respectively connected to a plurality of authentication user delegate servers,
      receiving the credential at the authentication user delegate server,
      selecting a unique user credential for the mobile device,
      instructing the authentication server to use the unique user credential in place of the credential to authenticate the mobile device, and
      sending the acknowledgement that the mobile device is authenticated.

9. The media of claim 8, wherein the network access server cannot register the mobile device with the credential when the credential comprises the authentication user delegate request.

10. The media of claim 9, wherein the authentication user delegate request comprises an identifier that indicates an authentication of the mobile device is accomplished using credentials provided by a network service rather than using credentials in the mobile device.

11. The media of claim 10, wherein the unique user credential comprises a username and password for the mobile device.

12. The media of claim 10, wherein the unique user credential is generated at the authentication user delegate server based on at least one of a set of rules, contextual information about the mobile device, user settings in the mobile device, a time, and a geographic location of the mobile device.

13. The media of claim 12, wherein the unique user credential is assigned and shared among multiple mobile devices.

14. The media of claim 13, further comprising registering the mobile device at a registration server using the unique user credential.

15. A system for causing one or more servers to authenticate a mobile device, comprising:
   an authentication server configured to receive a credential transferred by the mobile device and determines if the credential comprises an authentication user delegate request based on a format of the credential, wherein the mobile device requests access to data services;
   if the credential does not comprise the authentication user delegate request, the authentication server is configured to authenticate the mobile device at the authentication server and send an acknowledgement that the mobile device is authenticated; and
   if the credential comprises the authentication user delegate request and the credential comprises a re-assignable generic credential that is not configured to authenticate the mobile device, the authentication server is configured to verify that the credential is valid and contact an authentication user delegate server through a relay of a plurality of relays wherein the relay is selected based on the format of the credential and wherein the plurality of relays are respectively connected to a plurality of authentication user delegate servers, and send the acknowledgement that the mobile device is authenticated after receiving instructions from the authentication user delegate server;

the authentication user delegate server configured to receive the credential, selects a unique user credential for the mobile device, and instruct the authentication server to use the unique user credential to authenticate the mobile device.

16. The system of claim 15, wherein the network access server cannot register the mobile device with the credential when the credential comprises the authentication user delegate request.

17. The system of claim 16, wherein the authentication user delegate request comprises an identifier that indicates an authentication of the mobile device is accomplished using credentials provided by a network service rather than using credentials in the mobile device.

18. The system of claim 17, wherein the unique user credential is generated at the authentication user delegate server based on at least one of a set of rules, contextual information about the mobile device, user settings in the mobile device, a time, and a geographic location of the mobile device.

19. The system of claim 18, wherein the unique user credential is assigned and shared among multiple mobile devices.

20. The system of claim 19, further comprising a registration server that registers the mobile device using the unique user credential.

* * * * *